Jan. 21, 1941.   A. E. NASH ET AL   2,229,253
APPARATUS FOR HEATING OIL OR PETROLEUM TO ELEVATED TEMPERATURE
Filed Oct. 3, 1938   3 Sheets-Sheet 1
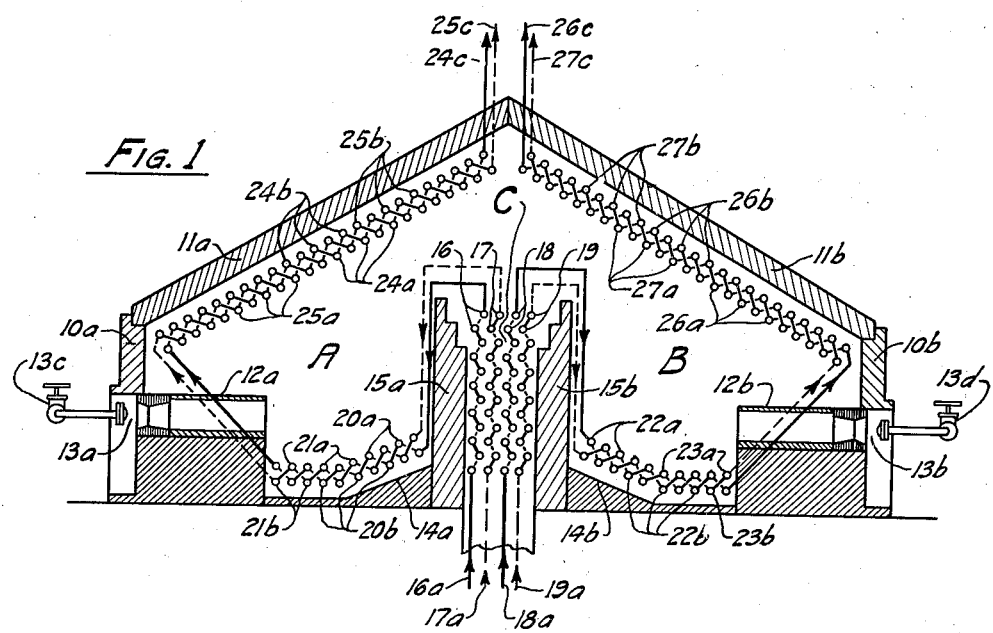
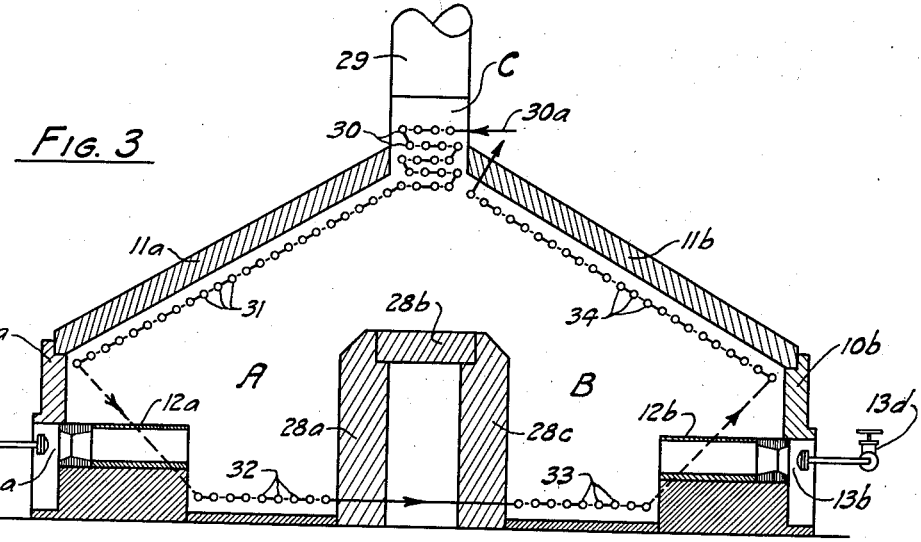
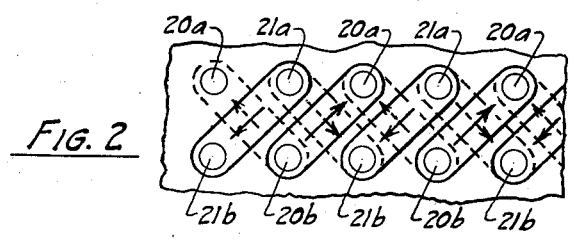
INVENTORS.
ARTHUR E. NASH AND
BY FRANKLIN E. SHELLY
Virgil E. Woodcock
ATTORNEY.

Jan. 21, 1941. A. E. NASH ET AL 2,229,253
APPARATUS FOR HEATING OIL OR PETROLEUM TO ELEVATED TEMPERATURE
Filed Oct. 3, 1938 3 Sheets-Sheet 3

INVENTORS
ARTHUR E. NASH and
BY FRANKLIN E. SHELLY
Virgil E. Woodcock
ATTORNEY

Patented Jan. 21, 1941

2,229,253

UNITED STATES PATENT OFFICE 2,229,253

APPARATUS FOR HEATING OIL OR PETROLEUM TO ELEVATED TEMPERATURE

Arthur E. Nash, Philadelphia, Pa., and Franklin E. Shelly, Bay City, Tex., assignors to Alcorn Combustion Company, a corporation of Delaware Application October 3, 1938, Serial No. 233,000

17 Claims. (Cl. 196—110)

Our invention relates to apparatus for heating oil or petroleum to elevated temperature.

The present application is a continuation-in-part of our copending application Serial No. 721,480, filed April 20, 1934 for Apparatus for heating petroleum, now Letters Patent No. 2,175,211.

More particularly our invention comprises improvements, modifications and additions to the heat transfer systems and methods disclosed in the copending application of Frank H. Praeger, Serial No. 497,553, filed November 22, 1930, now Patent #2,129,589, and has as its objects, among others, an increase in the operating efficiency of the system, a greater flexibility in controlling the heating cycle of the system, and a more economical construction of apparatus comprised in the system.

In general, our invention relates to heat transfer systems including a housing structure, means for maintaining therein a plurality of distinct currents of hot burning combustion gases either in distinct thermal zones or in physically distinct chambers. The apparatus of the system includes also a central chamber traversed by the combined currents of gases. A plurality of heat absorption structures, such as oil-conducting tubes, are disposed within the housing structure and so related to the plurality of currents of gases as to be heated therefrom, the relationship between the several heat-absorption structures and the currents of gases and other parts of the system being so determined as to control the components of heat transferred from the gases to the absorption structure, as by radiation, convection, or combined radiation and convection, in the several zones or chambers of the system. For example, certain oil-conducting tubes may be disposed adjacent the wall structure of the housing and below and substantially entirely without the currents of burning gases and heated substantially solely by radiation, while other oil-conducting tubes may be located within the central chamber traversed by the combined currents of gases and disposed to be heated mainly by convection.

In accordance with our invention and the illustrated forms thereof, certain portion or portions of the wall structure of the heating apparatus are sloped or inclined at an angle to reduce the distance between the heat absorption structure and the currents of hot or burning gases, in contrast to horizontally extending roof structure and tubes.

By the term "wall structure," as used herein, is meant all that structure including the roof, side walls, and/or the floor, the slope or inclination of such portions at times making it indeterminate whether a particular portion of the wall structure is, for example, side wall or roof; and by the term or terms "roof portion or portions" is or are meant that part of the wall structure which slopes upwardly from a point adjacent the firing muffles or burners, the said roof portion or portions simultaneously forming a part of the side wall structure.

By sloping the wall structure of the heating apparatus from a point adjacent the burners and by disposing roof tubes, which as a bank slope upwardly and away from the burners, those roof tubes adjacent and directly above the burners are disposed materially nearer to the burning gases than they would be if the heating chamber were rectangular. By so locating the tubes adjacent and along the path of burning gases greatly increased heat-input per unit area of heat-absorption surface is obtained, since the heat transfer rate in part varies inversely as the square of the distance; or, by decreasing the distance of the tubes from the flame by one-half increases by about four times, the transfer rate to the tubes. The upwardly sloping roof tube bank therefore operates more efficiently, i. e. the rate of heat input to each tube, from one side of the bank to the other is more uniform, and none of the tubes is located in a position to receive materially less heat than any other tube of the bank, in contrast with structures previously devised where the tubes in the corners of rectangular fire chamber were located a substantial distance from the burner structure and the burning gases, and therefore received materially less heat than other tubes of the roof bank.

Moreover, by sloping the wall structure of the heating apparatus to conform approximately to the flow of the gases through the system, specifically from burners to convection chamber, pockets and eddies are avoided and a streamline flow of the combustion gases is induced. The absorption of heat per unit area per unit time throughout the system is more uniform, and for a given size of heater there is procured higher average rates of heat transfer per unit area of surface of the heat absorption structure approaching or substantially equalling the maximum rate of heat transfer per unit area heretofore obtained in a part only of the heat absorption structure of a system. The sloping wall structure makes possible also reduction of the total or actual area of wall structure for a given capacity furnace, thus correspondingly decreasing its construction cost, and decreasing the losses of heat from the exterior surfaces of the furnace.

In accordance with another feature of our invention, the hot, burning, combustion gases are introduced into the housing through auxiliary combustion chambers or muffles, and these muffles may diverge fan-like to aid in the heating of the end walls of the wall structure the better to enable them to act as radiant sources. Due to the sloping roof portions the height of the side walls increases as the distance from the burner increases, whereby a greater heat-radiating surface is provided for the tubes more remote from the burners.

While our invention comprises heat-absorption structures connected to conduct the oil through the several zones or chambers of the system in any desired sequence, it is more particularly directed to a system which is especially desirable in certain instances; namely, that of conducting the oil serially through all the heat-absorption structures deriving their heat from the plurality of currents of combustion gases. These several currents of combustion gases may be regulated separately or independently to control the rates of application of heat to the oil in the several zones or chambers of the system, thus providing a flexible system suitable for treating oils of widely variant physical or thermal characteristics.

For a better understanding of our invention, together with other and further features thereof, reference is had to the following description, taken in connection with the accompanying drawings, and its scope will be pointed out in the appended claims.

Referring to the drawings,

Fig. 1 is a cross-sectional view in elevation of a heat transfer system embodying our invention in which four streams of oil are passed through the system in parallel, while Fig. 2 is a detail view of the arrangement of the oil-conducting tubes of Fig. 1. Fig. 3 is a cross-sectional view in elevation of a modification of Fig. 1, in which an up-draft convection section is provided and tubes are provided for the passage of oil in a single stream.

Fig. 4 is a cross-sectional view in elevation of a further modification in which the roof portion and side-wall portions of the wall structure are, respectively, horizontal and vertical, while

Fig. 6 is a cross-sectional view in elevation of a modification of the system of Fig. 1 having a somewhat different configuration of wall structure and only a single row of oil-conducting tubes in each zone of the furnace, all of the banks being connected to conduct the oil serially therethrough, while

Figure 4:
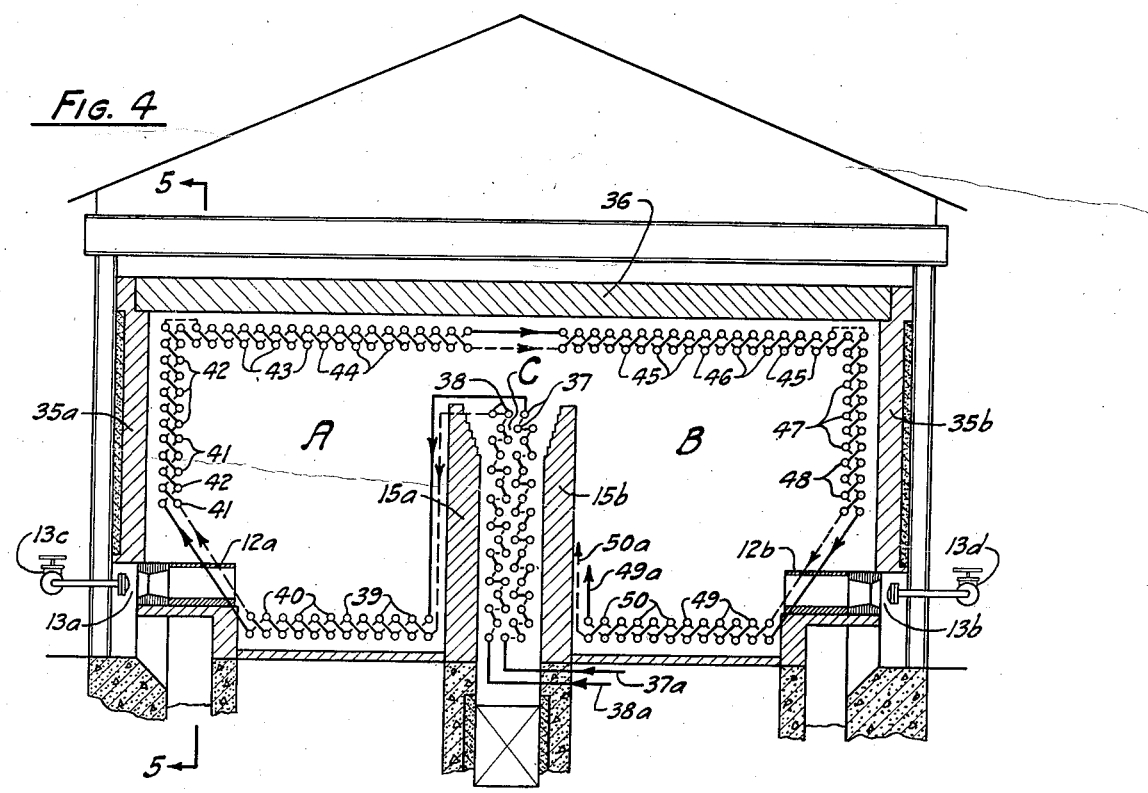

Referring now more particularly to Fig. 1, there is shown a heat-transfer system comprising three thermally distinct zones or chambers A, B and C. The chamber of zone A is defined by a wall structure including a vertical side-wall portion 10a and a sloping roof portion 11a of firebrick or other suitable refractory material. Currents of hot, still-burning, combustion gases are discharged into the chamber A from firing muffles or combustion chambers 12a disposed side by side in a horizontal plane, and having top plates and/or walls of highly refractory material, such as silicon carbide. These combustion gases are generated by supplying to the chambers 12a suitable fluid fuel, such as gas or oil, through burners 13a, adjustable as by the valves 13c. The combustion chambers 12a discharge into the chamber A substantially above the floor, and the floor portion of the wall structure is inclined or sloped at 14a opposite the discharge of the combustion chambers 12a. The zone or chamber A is separated from the zone or chamber C by means of baffles or barriers 15a of firebrick or other suitable refractory material.

The zone B is defined by corresponding structural elements having the same reference numerals with the subscript "b." The zone or chamber C is disposed between zones or chambers A and B and is traversed by the combined currents of gases flowing from chambers A and B and discharged from the combustion chambers 12a and 12b. Within the chamber C are disposed a plurality of heat-absorption structures, such as the groups of oil-conducting tubes 16, 17, 18 and 19 connected, respectively, to the incoming oil lines 16a, 17a, 18a and 19a. While our invention is not limited thereto, the roof portions 11a and 11b may slope upwardly from the horizontal at angles of about 10, 22 or 45 degrees, though about 22° has been found highly satisfactory.

Disposed adjacent the floor of the chamber A and beneath the discharge from the combustion chambers 12a are two groups or banks of oil-conducting floor tubes 20a—20b and 21a—21b; the upper row in that floor-tube bank comprises a plurality of tubes 20a and 21a, respectively, spaced somewhat from the floor and the lower row comprises a plurality of other tubes 20b and 21b disposed between the floor and the tubes 20a and 21a and in alignment with the tubes 21a and 20a; that is respectively, in alignment in directions normal to the floor portion of the wall structure. The tubes in alignment belong to different groups; that is, the groups 20a—20b and 21a—21b. The connections between adjacent inner and outer tubes of each group are made at opposite ends of the furnace, corresponding end connections inclining in the same direction, as shown in greater detail in Fig. 2. In this figure, the solid lines indicate the connections at one end of the furnace and the dotted lines the connections at the other end, the solid and dotted arrows indicating the direction of flow in the respective end connections. This particular connection is particularly simple and economical and insures that the heat-transfer to the two banks of tubes will be substantially or exactly equal.

Adjacent the roof portion 11a of the wall structure are two banks or groups of tubes 24a—24b and 25a—25b arranged similarly to the banks 20a—20b and 21a—21b. Similarly, adjacent the floor of the chamber B are disposed the groups of tubes 22a—22b and 23a—23b, while adjacent the sloping roof section 11b of this chamber are disposed the banks of tubes 26a—26b and 27a—27b.

While the oil may be conducted through the several banks of tubes in any desired sequence by making the appropriate connections, in the system illustrated in Fig. 1 the oil flows through the system in four parallel paths or streams comprising, respectively, the banks of tubes 16—20a—20b—24a—24b, 17—21a—21b—25a—25b, 18—22a—22b—26a—26b, and 19—23a—23b—27a—27b, emerging in the oil lines 24c, 25c, 26c and 27c, respectively. The two streams of oil through each portion of the furnace are represented by solid and dotted lines, respectively, to aid in tracing their paths of flow.

In the operation of the above-described apparatus, the combustion of the fuel supplied to the burners 13a is begun and may be partially or wholly completed within the combustion chambers or muffles 12a and the hot still-burning combustion gases discharged therefrom pass inwardly into chamber or zone A.

The still-burning and partially burned currents of gases are by the muffles 12a directed into the chamber A and horizontally over and above the floor tubes 20a—20b and 21a—21b. From the ends of the muffles the currents, particularly after decrease in their initial and relatively high velocity, expand and move upwardly. The firing conditions, burner pressure, draft and the like, are such that none of the floor tube structure is washed by the currents of gases; and such that there is induced a streamline flow of gases to the chamber C, and which streamline flow is particularly characterized by a path directly adjacent the banks of roof tubes; or conversely the slope of the roof banks conforms with said streamline flow to insure high average rate of heat input to all the tubes of each said bank. The left-most roof tubes as viewed in Fig. 1 are directly above radiant muffles 12a and absorb heat at high rate substantially solely by radiation; all roof tubes receive heat by radiation at high rate, and those tubes above baffle structure 15a additionally receive heat by convection as well as by radiation, but are not overheated since the gases contacting them have been reduced in temperature by the radiant transfer. The heat transfer to the said floor tubes is substantially solely by radiation from the still-burning gases, the products of combustion, and the furnace refractory. The currents of gases in rising streamline-flow pass over the bridge wall of each of the firing chambers A and B and downwardly through the central down-draft convection section C. The respective banks of roof tubes slope upwardly from opposite side walls 10a and 10b from points directly above and adjacent burners 13a and 13b in substantial conformity with the induced streamline flow of the gas currents and with the roof portions, and absorb heat by convection and by radiation. The combustion of the gases within the chambers or muffles 12a and 12b heats the walls thereof to very high temperatures so that they become secondary radiant sources, as do also certain portions of the wall structure and the baffles 15a and 15b, not covered by heat absorbing structure particularly the side walls, the height of which from the floor to sloping roof materially increases as the distance from the burner increases; wherefore, the area of radiating refractory increases as the gases give up their heat.

The upwardly inclined roof tube banks 24a—24b and 25a—25b, inclined at an angle of about 22° and conforming with the streamline flow, are not directly swept by the gas streams, but the hotter gases of the gas currents do rise upwardly along and through the roof tubes, giving up some heat to them by convection. The currents of hot combustion gases from the muffles 12a and 12b unite above the baffle structure 15a and 15b and together pass downwardly through section C, convectively heating tube banks 16, 17, 18 and 19, and from section C the gases pass to the stack (not shown). Some of the heat received by the banks of tubes 16—19 is due to radiation from the inner walls of the baffles 15a and 15b, and to radiation received from firing chambers A and B.

The effect of the banks of tubes 20a and 21a positioned adjacent but beneath the discharge from the combustion chambers 12a is to absorb from the currents of gases a substantial portion of their contained heat and to effect a reduction in temperature thereof to prevent an excessive rate of heat transfer to the banks of tubes, such as 24a, 25a, contacted by the currents of gases in their travel through the furnace. This feature is described in greater detail in the above-named Praeger application now U. S. Patent No. 2,129,-589. And in accord with this invention the sloping roof tube banks absorb heat at materially higher rates, and act concurrently with the floor tube banks to take heat from the gases.

By the arrangement of the two banks of tubes in each heating zone or chamber of the furnace, connected criss-cross at their ends, the oil in the two banks of tubes is conducted through paths having the same heating relationship to the currents of gases; that is, the oil in each bank of tubes passes alternately through an inner tube and an outer tube so that substantially the same amount of heat is transferred to the tubes of each bank. Both the total amount of heat transferred to, and the heat cycle of, the oil streams, as they pass through the furnace, are the same for all parallel paths.

While a particular sequence of passage of oil through the several heating zones of the furnace is illustrated in Fig. 1, it will be apparent that the oil may be passed through the several zones in any desired sequence in accordance with the heating requirements of a particular system.

In accord with the modification of Fig. 3, the function of the sloping roof portions 11a and 11b is the same as described in connection with Figs. 1 and 2. Similarly the muffles or combustion chambers direct streams of burning combustion gases horizontally across and above the horizontally disposed floor tubes 32 and 33 respectively disposed in single rows in fire chambers A and B. The floor tubes 32 and 33 receive heat substantially solely by radiation directly from the gases and furnace refractories, while the upwardly sloping roof tubes 31 and 34 respectively within chambers A and B conform with the induced streamline flow of the gases which extends from the muffles 12a and 12b to the updraft convection section C, to absorb heat partly by radiation and partly by convection from the gases. In this modification, the area of radiating refractory, due to the horizontal floor in combination with the sloping roof, increases more rapidly as the distance increases from the burners toward the convection section. A substantial amount of the heat absorbed by tubes 30 is by convection from the gases, the lowermost tubes thereof also receiving heat by radiation from the gases within the fire chambers and from the upstanding baffle structure 28a, 28b and 28c which divide the housing structure into the separately fired chambers A and B.

As shown, the oil first traverses the convection tubes 30, thence passes through roof tubes 31 and floor tubes 32 of fire chamber A and thereafter through floor tubes 33 and roof tubes 34 of fire chamber B. By suitably adjusting burners 13c and 13d, the oil during passage through fire chamber A may be rapidly heated to conversion or cracking temperature, while in chamber B it may be maintained at or above that cracking temperature for completion of the cracking reaction. Conversely the oil may be gradually and progressively elevated in temperature, attaining its final cracking temperature by high rate of heat input in chamber B.

Figure 5:
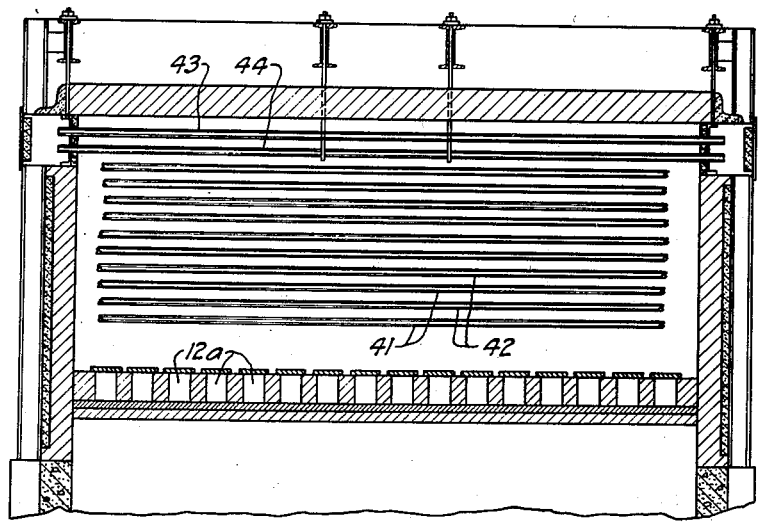
Fig. 5 is a transverse cross-sectional view along the line 5—5 of Fig. 4.

In the modified heat-transfer apparatus of Figs. 4 and 5, the arrangement of the combustion chambers and associated burners and the central chamber C formed by the baffles 15a, 15b is substantially the same as that of Fig. 1, but in this modification the wall structure comprises vertical side-wall portions 35a, 35b and a horizontal roof portion 36. In this case two banks or groups of oil-conducting tubes 37 and 38 connected to incoming lines 37a, 38a, respectively, are disposed in the chamber C traversed by the combined currents of gases to receive heat preponderantly by convection or by combined convection and radiation. The parallel streams of oil through the banks of tubes 37 and 38 pass, respectively, through the banks of tubes 39 and 40, positioned adjacent and below the discharge of the combustion chamber 12a and heated substantially solely by radiation; through the tubes 41 and 42 placed along the side wall 35a and heated largely by radiant transfer thereto; through the banks of roof tubes 43, 44 and 45, 46 heated by combined radiation and convection; through the side-wall tubes 47 and 48 in chamber B also heated largely by radiation; and through the floor tubes 49 and 50 below the discharge of the combustion chambers 12b heated substantially solely by radiation. The two streams exit through lines 49a and 50a. That is, there are provided two parallel paths which include serially-connected banks of tubes in each of the several heating zones or chambers of the furnace. This arrangement combines the advantages of parallel streams of oil with equal heat inputs, as in the apparatus of Fig. 1, with the controlled heat cycle of Fig. 3, resulting from passing each stream of oil through the chambers A and B in which are maintained separately adjustable currents of hot, initially-burning, combustion gases.

Figure 6:
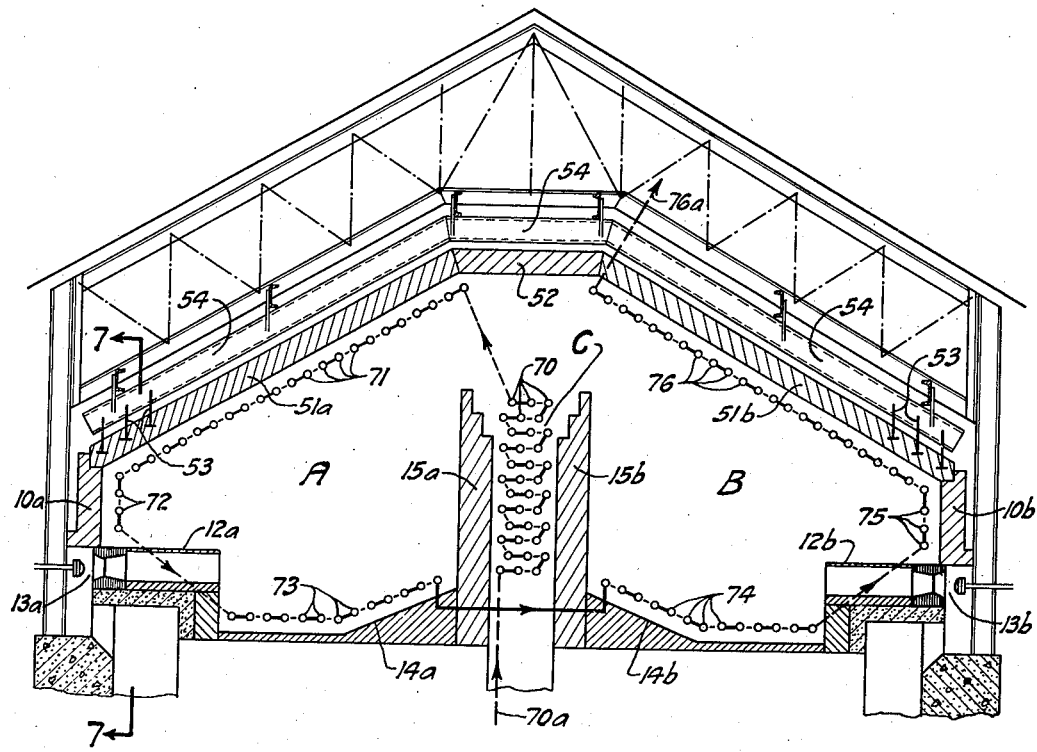
Figure 7:
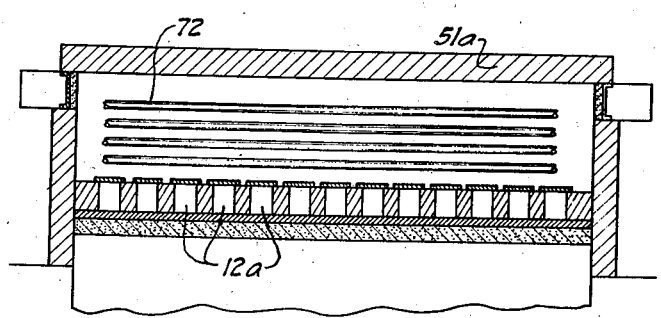
Fig. 7 is a transverse cross-sectional view along the line 7—7 of Fig. 6.

In the apparatus shown in Figs. 6 and 7 the wall structure of Fig. 1 is modified to comprise the side wall portions 10a, 10b, and sloping roof portions 51a, 51b, joined at the top by a horizontal roof portion 52. Fig. 6 illustrates schematically the manner in which such a roof structure may be supported, the supporting means comprising a plurality of hangers 53 engaging the refractory material of the roof portions 51a, 51b, and 52 which customarily is supplied in sectionalized blocks or slabs. The hangers 53 depend from girders 54 that form an integral part of the supporting roof truss.

In this modification, the combustion chambers 12a and 12b are associated with the side walls 10a and 10b, respectively, as in Fig. 1. In this case, the heat-absorption structure comprises a bank of oil-conducting tubes 70 disposed in the chamber C to receive heat preponderantly by convection or combined radiation and convection and connected to the incoming oil line 70a. The oil flows from the tubes 70 through the banks of tubes 71 and 72 comprising a single row of tubes adjacent the wall structure of chamber A and the bank of tubes 73 disposed along the floor of the chamber A in front of and below the discharge from the combustion chambers 12a. Thence, the oil flows through the similarly arranged banks of tubes 74, 75 and 76 in chamber B emerging at line 76a. As in the foregoing systems, the banks of floor tubes 73 and 74 are heated substantially solely by radiation, the wall tubes 72 and 75 largely by radiation, while the roof tubes 71 and 76 are heated by radiation and convection. The principles of operation involved in this apparatus will be clear from the explanation of the foregoing figures.

Our invention as embodied and illustratively shown in Figs. 1, 3 and 6 is particularly characterized by the provision of the upwardly sloping roof portions, the slopes of which substantially conform with the induced streamline flow of gases from the muffles, or firing means to the convection chamber. In accord with further aspects of our invention, tubular heat absorption structure is disposed relatively closely adjacent and above the burners, the said structure extending or sloping upwardly in advance of the discharge of burning gases; thus bringing the structure adjacent the roof near to but not directly within the current of gases, and maintaining the proximity of the heat absorption structure to the current of gases as they travel from firing muffle or burner to the convection section, which latter may be either of the up-draft or down-draft type. By so sloping the roof tubes and thereby bringing them close to but not directly in the streamline flow of gases, higher average rates of heat transfer per unit of time per unit of area of the roof tubes are procured, approaching or equalling or exceeding the maximum average rates of heat transfer per unit area of the floor tubes. The roof tube banks absorb more heat and there is more uniform distribution of heat without overheating of the roof tubes, since the temperature of the products of combustion is moderated by the transfer of part of their heat before the hot products of combustion sweep across the roof tubes.

While we have illustrated our invention as embodied in a number of specific apparatus, it will be apparent to those skilled in the art that various features of the several modifications may be combined in any way desired to meet the particular requirements of any system, and that various other changes and modifications may be made without departing from the spirit and scope of our invention, as defined in the appended claims.

What we claim is:

1. Oil-heating apparatus comprising a housing embracing wall structure forming separate fire chambers on opposite sides of a centrally disposed convection section, combustion chambers discharging hot combustion gases into each of said fire chambers, said wall structure including a floor portion sloping upwardly in advance of the discharge of said combustion chamber, said wall structure including also a roof portion sloping upwardly from above said combustion chamber and in the direction of flow of said gases and from opposite outer walls of said housing toward the center thereof and oil-conducting heat-absorption structures free of radiation-intercepting refractory disposed adjacent said floor and roof portions of said wall structure, said structure adjacent said floor, below and without the current of said gases, absorbing heat directly from said current of gases substantially solely by radiation.

2. Oil-heating apparatus comprising a housing embracing wall structure, said housing including a centrally disposed heating chamber distinct from the rest of the housing structure, and forming with said housing fire chambers disposed on opposite sides of said central chamber, a plurality of combustion chambers associated with the outer walls of said housing and disposed to discharge a plurality of currents of hot and still-burning combustion gases toward said central chamber, and across each of said fire chambers, said central chamber being traversed by the combined currents of gases, said wall structure including floor portions sloping upwardly in advance of the discharge of said combustion chambers, said wall structure including also roof portions sloping upwardly from the outer walls thereof, oil-conducting heat-absorption structures free of radiation intercepting refractory disposed adjacent said floor and roof portions of said wall structure and conforming to the streamline flow of said currents of gases therebetween, and other oil-conducting heat-absorption structure disposed in said central chamber to be heated by convection from the combined currents of gases.

3. An oil-heating system comprising wall structure forming a housing including a plurality of heating chambers, two of said chambers being disposed end-to-end on opposite sides of a central chamber, said wall structure including roof portions sloping upwardly from opposite outer walls of said housing and toward said central chamber, means disposed horizontally adjacent said opposite outer walls for maintaining within each of said two heating chambers currents of burning combustion gases which slope upwardly from said means toward each other and which combine within said central chamber, the slope of each said roof portion conforming approximately to the streamline flow of said upwardly sloping gas current, oil-conducting heat-absorbing tubes free of radiation-intercepting refractory adjacent, extending transversely of, and spaced one from the other upwardly along, said sloping roof portions to conform approximately with the streamline flow of said gas currents for equalizing between the roof tubes absorption of heat from said gases, and a bank of oil-conducting heat-absorbing tubes disposed within said central chamber and serially connected with said first-mentioned tubes.

4. An oil-heating system comprising wall structure forming a housing including a plurality of heating chambers, two of said chambers being disposed end-to-end on opposite sides of, and in open communication with, a central chamber, said wall structure including roof portions sloping upwardly from opposite outer walls of said housing toward and above said central chamber, means adjacent the lower portions of said opposite outer walls for maintaining within each of said two heating chambers currents of initially burning combustion gases which combine within said central chamber, the slope of each said roof portion conforming approximately to the streamline flow of said gas currents, oil-conducting heat-absorbing tubes disposed adjacent each of said upwardly sloping roof portions and so conforming approximately to the streamline flow of said gas currents that the individual roof tubes are subjected to substantially the same rate of heat application from said gases, a bank of floor tubes free of radiation-intercepting refractory disposed within each of said two heating chambers below and substantially entirely without the currents of gases therein and absorbing heat directly from said initially burning gases substantially solely by radiation, and a bank of tubes within said central chamber heated by said combined currents of gases.

5. In an oil-heating system the combination of wall structure forming a housing including a plurality of heating chambers, two of said chambers being disposed end-to-end on opposite sides of a central chamber, said wall structure including roof portions sloping upwardly from the lower portions of opposite outer walls of said housing and toward said central chamber, means adjacent said opposite walls for maintaining within each of said two heating chambers currents of initially burning combustion gases, the slope of each said roof portion conforming approximately to the streamline flow of said gas currents, oil-conducting heat-absorbing tubes free of radiation-intercepting refractory disposed adjacent each of said upwardly sloping roof portions and conforming approximately to the streamline flow of said gas currents for absorption of heat by radiation and convection, a bank of floor tubes free of radiation-intercepting refractory disposed within each of said opposed heating chambers below and substantially entirely without the currents of gases and absorbing heat directly from said initially burning gases substantially solely by radiation, said central chamber being traversed by the combined currents of gases from said two chambers, a bank of oil-conducting heat-absorption tubes disposed within said central chamber to be heated by convection from said combined currents of gases, and means connecting said banks of tubes for passage of oil through said last-named bank of tubes and then through the tubes within one, and then through the tubes within said other, of said two heating chambers.

6. In an oil-heating system the combination of refractory wall structure forming a housing including a plurality of heating chambers, two of said chambers being disposed end-to-end on opposite sides of, and in communication with, a central chamber, said wall structure having refractory roof portions for each of said two chambers, and each said roof portion sloping upwardly toward the other from opposite side walls and joined together intermediate said side walls, means individual to said two chambers for producing currents of gases individual thereto, said slope of said roof portions substantially conforming to the streamline flow of the currents of gases individual thereto, oil-conducting heat-absorbing tubes disposed adjacent and along said roof portions of each of said two chambers for absorbing heat by radiation and convection, oil-conducting heat-absorbing tubes within and adjacent the floor of each of said chambers and below and substantially entirely without the currents of gases individual thereto, for absorbing heat directly therefrom substantially solely by radiation, and a superstructure for supporting said upwardly sloping roof portions comprising girders sloping upwardly substantially parallel with said roof portions and joined together intermediate said side walls, supports for said girders spaced from said wall structure, and a plurality of hangers depending from said girders and distributed along said roof portions in supporting relation therewith.

7. In an oil-heating system, the combination of refractory wall structure forming a heating compartment, upstanding baffle structure therein forming a convection section and dividing said compartment into fire chambers disposed on opposite sides of said convection section, means individual to each of said fire chambers and adjacent opposite side walls of said compartment for producing in said fire chambers currents of initially burning combustion gases, the combined currents from said fire chambers passing above said baffle structure and through said convection section, said wall structure including a roof which from said opposite side walls, adjacent and directly above said means, slopes upwardly in substantial conformity with the path of the combustion gases extending from said means above said baffle structure, tubular oil-conducting heat-absorbing structure disposed within said convection section, and adjacent the floor of each fire chamber beneath and substantially entirely without the currents of gases therein, and tubular oil-conducting heat-absorbing structure disposed adjacent said sloping roof and in each of said fire chambers adjacent and substantially parallel to said path of said combustion gases.

8. An oil-heating system comprising wall structure forming a housing including a plurality of heating chambers, two of said chambers being disposed end-to-end on opposite sides of a central chamber, said wall structure including roof portions which slope upwardly from opposite outer walls of said housing toward each other and join together above said central chamber, means disposed on opposite sides of said central chamber for directing horizontally and maintaining within the lower portions of each of said heating chambers currents of initially burning combustion gases, said gases rising in streamline flow upwardly adjacent said roof portions and then traversing said central chamber, the slope of each said roof portion conforming approximately with the streamline flow of said gas currents, and tubular oil-conducting heat-absorbing structure free of radiation-intercepting refractory disposed in said housing adjacent each of said upwardly sloping roof portions and so conforming with said rising currents of gases as to substantially equalize the heat application to all parts of said structures.

9. An oil-heating system comprising wall structure forming a housing including a plurality of heating chambers, two of said chambers being disposed end-to-end on opposite sides of a central convection chamber, said wall structure including a roof portion sloping upwardly at a substantial angle from opposite outer walls of said housing and toward said central chamber, means disposed on opposite sides of said central chamber for maintaining within the lower portions of each of said heating chambers currents of initially burning combustion gases, said gases extending initially horizontally and then upwardly from said means and in streamline flow respectively passing adjacent said roof portions and then together traversing said central convection chamber, the slope of each said roof portion conforming approximately to said streamline flow of said gas current, and a plurality of oil-conducting tubes disposed in said housing adjacent, and distributed along each of said upwardly sloping roof portions with the longitudinal axes thereof transverse to said gas currents and approximately conforming to said streamline flow of said gas currents to be substantially equally heated directly by radiation and convection therefrom.

10. In a system of heating oil to elevated temperature, the combination of wall structure forming a housing, inner wall structure within said housing dividing it into communicating fire chambers, means disposed on opposite sides of said inner wall structure materially below the upper level thereof for producing within each of said fire chambers currents of hot combustion products initially directed generally horizontally towards said inner wall structure, an updraft convection section common to said fire chambers and located centrally of said housing and above said fire chambers for receiving the combined currents of gases from said fire chambers, said wall structure including roof portions which from a level just above said means slope upwardly from opposite side walls towards, and terminating at, said central convection section, a bank of bare roof tubes distributed along said roof portions and so conforming with the streamline flow of gases extending from said means to said convection section as to subject the tubes thereof to uniform application of heat thereto, and tubular heat absorption structure located within said convection section and heated by convection from said gases.

11. A system of heating hydrocarbon fluid to cracking temperature comprising wall structure forming a housing including a plurality of heating chambers connected to a stack, two of said chambers being disposed end-to-end on opposite sides of a central chamber, said wall structure including roof portions sloping upwardly from the lower portions of opposite outer walls of said housing and toward each other and terminating in a connecting roof portion, means disposed on opposite sides of said central chamber and along opposite outer walls at the lower portions thereof for maintaining within the lower portions of each of said heating chambers currents of initially burning combustion gases, said means and the draft of said stack inducing streamline flow of said gases upwardly adjacent said roof portions, the combined gases thereafter traversing said central chamber, the slope of said roof portions conforming approximately with said induced streamline flow of said gas currents, tubular oil-conducting heat absorption structure disposed in said housing adjacent said upwardly sloping roof portions and approximately conforming with said streamline flow of said gas currents to be heated directly from said gas currents, and tubular oil-conducting heat-absorption structure disposed in each of said heating chambers below and without said initially burning gases and absorbing heat directly therefrom substantially solely by radiation, both said structures disposed for passage of oil first through one and then through the other of said structures and for passage through said structures in directions substantially transverse to the direction of travel of said gas currents.

12. A system of heating oil to elevated discharge temperature comprising walls forming a heating chamber, the roof of which slopes upwardly from a side wall thereof and the floor of which extends horizontally therefrom, means located horizontally along the lower portion of said side wall for discharging generally horizontally into said heating chamber currents of initially burning combustion gases, means forming a convection section subject to stack-draft and including upstanding refractory baffle structure for inducing streamline flow of said gas currents in a direction which slopes upwardly from said first-named means toward and above said baffle structure, said slope of said roof portion approximately conforming to the slope of said streamline flow of said gases, a bank of bare roof tubes the individual tubes of which are disposed along said sloping roof portion transversely of, and in approximate conformity with, said streamline flow of said gases and spaced from said streamline flow for equalizing the heat application to said tubes, and a bank of bare tubes the individual tubes of which are disposed transversely of, and below and without, the currents of gases and are distributed horizontally along said heating chamber, both said banks of tubes absorbing heat directly from said initially burning gases, and said baffle structure being free of heat-absorbing tubes and forming a secondary source of radiation for said banks of tubes.

13. A system of heating fluid to elevated temperature comprising walls forming a heating chamber, the roof of which slopes upwardly from a side wall thereof, means located horizontally along the lower portion of said side wall for discharging generally horizontally into said heating chamber a plurality of currents of initially burning combustion gases, means forming a convection section subject to stack-draft and including an entrance thereto, a vertical refractory wall opposite said first-named means and positioned to induce streamline flow of said gases upwardly from said first-named means into said convection section, the slope of said roof portion approximately conforming to the slope of said upwardly extending currents of gases, a bank of roof tubes the individual tubes of which are disposed adjacent said upwardly sloping roof portion in approximate conformity with said streamline flow and transversely thereof, and each tube thereof being approximately the same distance from the major portion of said upwardly rising currents of gases, whereby each said tube absorbs substantially the same amount of heat therefrom, a bank of tubes disposed horizontally below and without said currents of gases and in open radiant view therewith and in open view of said roof tubes, said vertical wall being free of heat-absorbing tubes and forming a secondary source of radiation for said tubes, a bank of tubes within said convection section absorbing heat from said gases by convection, and means interconnecting said banks for passage of fluid therethrough.

14. In a system of heating oil to cracking temperature, the combination of wall structure forming a housing with an updraft convection section intermediate a pair of firing zones, a bank of roof tubes and a bank of floor tubes within each of said firing zones, burner structure individual to each of said firing zones for initially directing a plurality of currents of burning gases in a horizontal direction intermediate said banks of roof and floor tubes, said currents of gases extending transversely across said banks of tubes and said currents of gases from said firing zones uniting within said updraft convection section, vertical baffle structure intermediate said zones extending well above said burner structure and toward said convection section to induce independent flow of gases from said zones into said convection section, a bank of tubes heated by convection from said united currents of gases, and means serially connecting said banks of tubes for passage of oil first through one and then through the remaining banks of tubes.

15. A system of heating oil to oil-cracking discharge temperature comprising walls forming a heating chamber, the roof of which slopes upwardly from a side wall progressively and materially to increase the height of the end walls and the vertical distances between the roof and floor of said chamber as measured at points progressively farther from said side wall, means spaced horizontally along the intermediate portion of said side wall for discharging generally horizontally into said heating chamber a plurality of currents of initially burning combustion gases, means forming a convection section subject to stack-draft and so disposed as to induce streamline flow of said gas currents in a direction which slopes upwardly from said first-named means, a bank of bare roof tubes the individual tubes of which are disposed along said sloping roof in approximate conformity with, and spaced from, said streamline flow of said gases, refractory wall structure free of heat-absorbing tubes opposite said first-named means and receiving heat from said gases for radiation to said roof tubes, a bank of bare tubes disposed below and without the currents of gases and distributed horizontally along the floor of said chamber, said increase in the vertical distances between said floor and roof providing progressively increasing refractory wall surface for radiation of heat to said tubes.

16. A system of heating fluid to elevated temperature comprising walls forming a heating chamber having a substantially horizontal floor, and a roof which slopes upwardly from a side wall progressively and materially to increase the vertical height of the end walls and of the chamber as measured from points on the floor progressively farther from said side wall, a plurality of burners spaced horizontally from each other along the intermediate portion of said side wall for directing generally horizontally into said chamber a plurality of currents of initially burning combustion gases, means forming a convection section subject to stack draft for producing a streamline flow of said gas currents in a direction which slopes upwardly from said burners, a refractory wall opposite said burners, a bank of roof tubes the individual tubes of which are disposed along said sloping roof in approximate conformity with said streamline flow of said gases and spaced from said streamline flow for equalizing the heat application to said tubes, a bank of tubes disposed below and without the currents of gases and distributed horizontally over said floor of said chamber, a substantial portion of said refractory wall end of the end walls of said chamber being free of heat-absorbing tubes to provide a gradually increasing area of radiating wall surface, a bank of tubes within said convection section, and means for circulating fluid through said banks of said tubes.

17. In an oil heating system, the combination of wall structure forming a heating compartment, upstanding baffle structure therein forming a convection section and dividing said compartment into fire chambers disposed on opposite sides of said convection section, means individual to each of said first chambers and adjacent opposite side walls of said compartment for producing in said fire chambers currents of initially burning combustion gases, the combined currents from said fire chambers passing in streamline flow above said baffle structure and through said convection section, said wall structure including a horizontal floor for each of said fire chambers, and a roof therefor which from said opposite side walls, adjacent and directly above said means, slopes upwardly in substantial conformity with the path of the combustion gases extending from said means above said baffle structure, said slope of said roof materially and progressively increasing the vertical height of the end walls and of said fire chambers as measured from points on the floor progressively farther from said means, tubular oil-conducting heat-absorbing structure disposed within said convection section, tubular oil-conducting heat-absorbing structure adjacent the floor of each fire chamber beneath and substantially entirely without the currents of gases therein, and tubular oil-conducting heat-absorbing structure disposed adjacent said sloping roof and in each of said fire chambers adjacent and substantially parallel to said path of said combustion gases, a substantial portion of at least the end walls of said chamber being free of oil-conducting heat-absorbing structure to provide a gradually increasing area of radiating wall surface.

ARTHUR E. NASH.
FRANKLIN E. SHELLY.

CERTIFICATE OF CORRECTION.

Patent No. 2,229,253.　　　　　　　　　　January 21, 1941.

ARTHUR E. NASH, ET AL.

It is hereby certified that error appears in the printed specification of the above numbered patent requiring correction as follows: Page 3, first column, line 53, after the word "structure" insert a comma; page 7, second column, line 42, claim 16, for "wall end" read --wall and--; line 54, claim 17, for "first" read --fire--; and that the said Letters Patent should be read with this correction therein that the same may conform to the record of the case in the Patent Office.

Signed and sealed this 25th day of February, A. D. 1941.

Henry Van Arsdale, (Seal)　　　　　　　　　　　　　　Acting Commissioner of Patents